Figure 1:
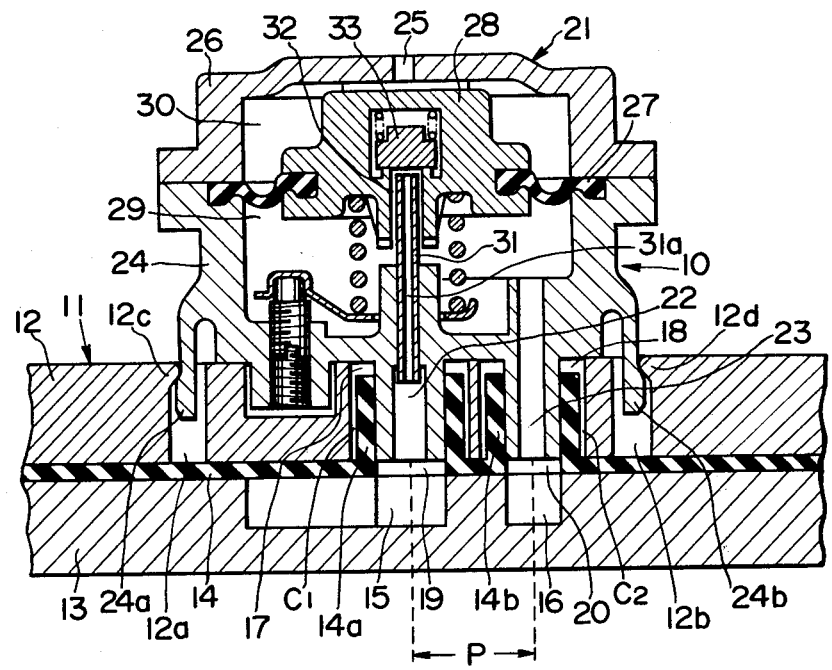

United States Patent [19]

Inada et al.

[11] 4,254,938
[45] Mar. 10, 1981

[54] SUCTION PRESSURE RESPONSIVE VALVE DEVICE

[75] Inventors: Masami Inada, Kariya; Kazuhiko Kitamura, Toyota; Shoji Ito, Nagoya; Takao Nonoyama; Riichi Tsuji, both of Toyota, all of Japan

[73] Assignees: Aisin Seiki Kabushiki Kaisha, Kariya; Toyota Jidosha Kogyo Kabushiki Kaisha, Toyota, both of Japan

[21] Appl. No.: 60,038

[22] Filed: Jul. 24, 1979

[30] Foreign Application Priority Data

Jul. 25, 1978 [JP] Japan ............................ 53-102037[U]

[51] Int. Cl.³ .................... F16K 31/12; F16J 15/16; F16K 51/00
[52] U.S. Cl. .................... 251/367; 137/DIG. 8; 137/627.5; 137/315; 277/27
[58] Field of Search .................... 137/505, 510, 505.13, 137/DIG. 8, 884, 315, 505.38; 251/367, 85; 123/407, 570; 277/3, 27

[56] References Cited

U.S. PATENT DOCUMENTS

| | | | |
|---|---|---|---|
| 2,758,447 | 8/1956 | Prosek | 137/596.17 |
| 3,086,544 | 4/1963 | Yost | 137/315 |
| 3,288,165 | 11/1966 | Cranage | 137/510 |
| 3,443,580 | 5/1969 | Kreuter | 137/315 |
| 3,511,270 | 5/1970 | Fehrenbach et al. | 137/510 |
| 3,685,789 | 8/1972 | Puster et al. | 251/367 |
| 3,766,943 | 10/1973 | Murata | 137/608 |
| 3,842,931 | 10/1974 | Andres | 180/103 |
| 3,982,553 | 9/1976 | Johnston et al. | 137/81 |
| 4,044,732 | 8/1977 | Inada et al. | 123/407 |
| 4,044,735 | 8/1977 | Sumiyoshi | 137/560 |
| 4,181,524 | 1/1980 | Yoshihiro et al. | 137/DIG. 8 |
| 4,194,745 | 3/1980 | McDugal | 277/27 |

FOREIGN PATENT DOCUMENTS

| | | | |
|---|---|---|---|
| 2545967 | 4/1976 | Fed. Rep. of Germany | 277/3 |
| 957118 | 5/1964 | United Kingdom | 137/DIG. 8 |

*Primary Examiner*—Martin P. Schwadron
*Assistant Examiner*—A. Michael Chambers
*Attorney, Agent, or Firm*—Finnegan, Henderson, Farabow, Garrett & Dunner

[57] ABSTRACT

A valve device includes a base board and a suction pressure responsive valve having two ports defined by tubular portions. The base board is composed of a pair of superimposed plates and a sealing gasket between the plates. One of the plates is formed with a pair of channels and the other with a pair of openings communicating with the channels, respectively. The sealing gasket has a pair of tubular portions disposed respectively in the openings of the base board plate with radial clearances. The tubular portions of the suction pressure responsive valve are sealingly inserted respectively into the tubular portions in the sealing gasket.

3 Claims, 2 Drawing Figures

SUCTION PRESSURE RESPONSIVE VALVE DEVICE

The present invention relates to a valve device and more particularly to an integrated valve device which is adapted to be used in automobile exhaust systems.

In recently built automobiles, the exhaust system is provided with suction pressure responsive components such as suction pressure responsive control valves, suction pressure delay valves and suction pressure switching valves in order to constitute an exhaust gas purifying system. These components are usually disposed in various parts in the engine compartment so that complicated pipings are required to establish the exhaust gas purifying system. In order to simplify the pipings and provide a well arranged system, there has been proposed an integrated valve device in which the aforementioned suction pressure responsive components are assembled on a single base board.

In this type of valve device, each of the suction pressure responsive components has two or more ports which are connected with port openings formed in the base board. Since the valve device is subjected in use to vibration and shock loads from the engine on which the valve device is mounted, and uneven roads a reliable seal must be provided between the ports in the components and the openings in the base board. However, in conventional integrated valve devices, there has been a problem in that due to manufacturing errors the ports in the suction pressure responsive component are often deviated from the expected positions causing difficulties in asembling the component on the base board and producing adverse effects on the seal.

It is therefore an object of the present invention to provide an integrated valve device in which suction pressure responsive components can readily be mounted on a base board without producing any sealing problem.

According to the present invention, the above and other objects can be accomplished by a valve device comprising a base board formed with at least one opening, a seal member having a through hole and adapted to be mounted in the opening of the base board with a freedom of movement in the radial direction of the hole, and a suction pressure responsive component having at least one port adapted to be connected with the through hole in the sealing member. In the arrangement of the present invention, the seal member in the opening of the base board is movable in the radial direction of the through hole in the seal member so that any deviation of the port position in the component can be absorbed by the radial movement of the seal member. The base board may be made of a pair of plates which are superimposed on each other with a sealing gasket interposed therebetween. One of the plates is formed with said opening and the other with a channel which is connected with said opening through a hole in said seal gasket. The sealing member in the opening of the base board may be of a tubular form which may be integrally formed with the seal gasket. The sealing member may be arranged in the opening of the base board with an annular gap between the outer surface of the seal member and the periphery of the opening so that a certain amount of radial movement is allowed to the seal member.

Figure 2:
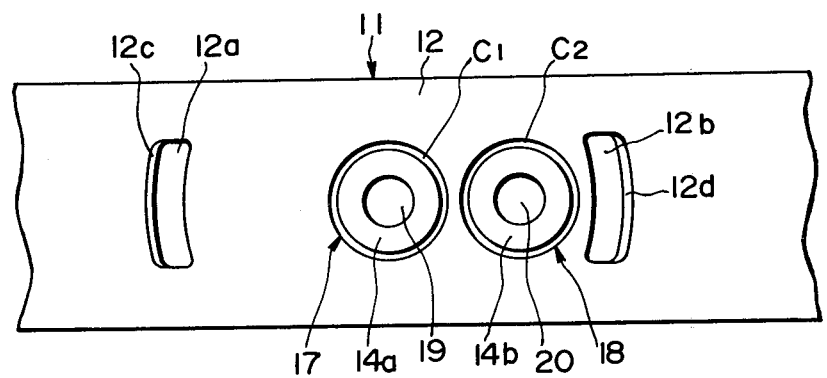

The above and other objects and features of the present inventon will become apparent from the following descriptions of a preferred embodiment with reference to the accompanying drawings, in which;

FIG. 1 is a sectional view of a valve device in accordance with one embodiment of the present invention; and, FIG. 2 is a plan view of the base board in the valve device.

Referring to FIG. 1, there is shown a valve device 10 including a base board 11 composed of a first plate 12 and a second plate 13 which are superimposed on each other with a resilient sealing gasket 14 interposed therebetween. The second plate 13 of the base board 11 is formed with channels 15 and 16 and the first plate 12 is formed with openings 17 and 18 for communicating with the channels 15 and 16, respectively. The channel 15 may be connected with a source of suction pressure (not shown) and the channel 16 with a control part (not shown).

The resilient sealing gasket 14 is integrally formed with tubular projections 14a and 14b which are disposed in the openings 17 and 18, respectively, with radial gaps $C_1$ and $C_2$ with respect to the peripheral walls of the openings 17 and 18. Thus, the projections 14a and 14b are movable in the radial directions. The projections 14a and 14b are respectively formed with axial through holees 19 and 20.

The base board 11 is adapted for mounting suction pressure responsive components such as suction pressure control valves, suction pressure delay valves, suction pressure switching valves and pressure switches which constitute an exhaust gas purifying system. In the illustrated embodiment, a control valve 21 is mounted on the base board 11. The control valve 21 comprises a first body 24 provided with a tubular inlet port 22 and a tubular outlet port 23, and a second body 26 having an air vent port 25. The first and second bodies 24 and 26 are assembled together with a diaphragm 27 disposed therebetween.

The diaphragm 27 has a diaphragm piston 28 and divides the inside of the bodies into a diaphragm chamber 29 and an atmospheric chamber 30. The diaphragm chamber 29 is always in communication with the outlet port 23 and the atmospheric chamber 30 with the vent port 25. The first body 24 is formed at the inlet port 22 with a pipe 31 which has a passage 31a and is inserted into the diaphragm piston 28 with a clearance 32. A valve member 33 is provided in the diaphragm piston 28 so as to close the passage 31a when the diaphragm 27 is deflected under a suction pressure which is transmitted into the chamber 29 through the inlet port 22, the passage 31a in the pipe 31 and the clearance 32 between the pipe 31 and the piston 28. The valve thus functions to provide a substantially constant suction pressure in the outlet port 23.

The inlet port 22 and the outlet port 23 of the suction pressure control valve 21 are gas-tightly fitted respectively to the axial holes 19 and 20 in the sealing gasket 14. Since the projections 14a and 14b are movable in the openings 17 and 18, respectively, in the radial directions, a reliable seal can be ensured at the ports 22 and 23 even if there is a change in the center distance between the inlet and outlet ports 22 and 23 due to a manufacturing error.

The first body 24 of the suction pressure control valve 21 is formed with radially flexible fingers 24a and 24b which are adapted to be inserted into cooperating openings 12a and 12b formed in the first plate 12 of the base board 11 to determine the position of the valve 21 on the base board 11. The openings 12a and 12b are respectively formed with shoulders 12c and 12d which engage the fingers 24a and 24b to maintain the valve 21 in position. Thus, the control valve 21 is mounted removably on the base board 11.

From the above descriptions, it will be understood that the objects of the present invention are accomplished. Although the invention has been described with reference to a specific embodiment, it should be noted that the invention is in no way limited to the details of the illustrated structures but changes and modifications may be made without departing from the scope of the appended claims.

We claim:

1. A valve device comprising base board means including a first plate formed with at least one opening and a second plate formed with at least one channel communicating with said one opening, sealing member means including a resilient sealing gasket interposed between said first and second plates, said first and second plates being superimposed on each other, and at least one resilient cylindrical projection integrally formed with said sealing gasket and disposed in said one opening with radial clearance with respect to said one opening; and a valve unit including at least one tubular portion adapted to be sealingly inserted into said resilient cylindrical projection for valving fluid flow through said cylindrical projection with the channel of said second plate, said valve unit also including a pair of resilient fingers adapted for engagement with corresponding openings in said first plate for detachably mounting said valve unit on said bae board means.

2. A valve device according to claim 1 wherein said first plate of the base board means includes a second opening and said second plate includes a second channel for communicating with the second opening, said sealing gasket being formed with a second resilient cylindrical projection disposed in said second opening with radial clearance with respect to said second opening, said valve unit including a second tubular portion adapted to be sealingly inserted into said second cylindrical portion for valving fluid flow through said cylindrical projection with the second channel of said second plate.

3. A valve device according to claim 1, wherein said fingers are formed at diametrically opposite positions, and the corresponding openings in said base board means include shoulders for engaging said fingers for maintaining the valve unit in position.

* * * * *